(12) United States Patent
Abusleme et al.

(10) Patent No.: US 10,676,549 B2
(45) Date of Patent: Jun. 9, 2020

(54) VINYLIDENE FLUORIDE POLYMERS

(71) Applicant: SOLVAY SPECIALTY POLYMERS ITALY S.P.A., Bollate (IT)

(72) Inventors: Julio A. Abusleme, Saronno (IT); Segolene Brusseau, Tavaux (FR)

(73) Assignee: SOLVAY SPECIALTY POLYMERS ITALY S.P.A., Bollate (IT)

( * ) Notice: Subject to any disclaimer, the term of this patent is extended or adjusted under 35 U.S.C. 154(b) by 0 days.

(21) Appl. No.: 15/512,245

(22) PCT Filed: Sep. 8, 2015

(86) PCT No.: PCT/EP2015/070428
§ 371 (c)(1),
(2) Date: Mar. 17, 2017

(87) PCT Pub. No.: WO2016/041808
PCT Pub. Date: Mar. 24, 2016

(65) Prior Publication Data
US 2017/0253678 A1    Sep. 7, 2017

(30) Foreign Application Priority Data

Sep. 17, 2014  (EP) .................................. 14306438

(51) Int. Cl.
| | | |
|---|---|---|
| *C08F 114/22* | (2006.01) | |
| *C08L 27/16* | (2006.01) | |
| *C08L 1/28* | (2006.01) | |
| *C08L 1/26* | (2006.01) | |
| *C08F 2/20* | (2006.01) | |

(52) U.S. Cl.
CPC .............. *C08F 114/22* (2013.01); *C08F 2/20* (2013.01); *C08L 1/26* (2013.01); *C08L 1/284* (2013.01); *C08L 27/16* (2013.01); *C08L 2205/03* (2013.01)

(58) Field of Classification Search
CPC .. C08F 2/20; C08F 114/22; C08L 1/26; C08L 1/284; C08L 27/16
See application file for complete search history.

(56) References Cited

U.S. PATENT DOCUMENTS

| 3,709,856 A * | 1/1973 | Dohany et al. ......... C08F 14/18 |
| | | 526/219 |
| 2012/0129982 A1 * | 5/2012 | Zipplies ................. C08F 14/18 |
| | | 524/58 |
| 2013/0260207 A1 * | 10/2013 | Uemura .................. H01M 2/16 |
| | | 429/144 |

FOREIGN PATENT DOCUMENTS

| EP | 2397519 A1 * | 12/2011 |
| GB | 1349764 A | 4/1974 |
| GB | 1495894 * | 12/1977 |
| GB | 1495894 A | 12/1977 |
| JP | 2011057871 A | 3/2011 |
| WO | 9849737 A1 | 11/1998 |
| WO | 2012084580 A1 | 6/2012 |
| WO | 2014095907 A1 | 6/2014 |

OTHER PUBLICATIONS

Latypov T. L. et al., "Suspension polymerization of fluoroolefins", Sbornik Nauchnykh Trudov—Tashkentskii Gosudarstvennyi Universitet im. V. I. Lenina, 1981, n° 667, p. 3-16.

* cited by examiner

*Primary Examiner* — Peter D. Mulcahy

(57) ABSTRACT

The present invention pertains to a process for manufacturing a vinylidene fluoride polymer, to a polymer obtainable via said process and to an article comprising the same.

17 Claims, No Drawings

VINYLIDENE FLUORIDE POLYMERS

CROSS-REFERENCE TO RELATED APPLICATION

This application is a U.S. national stage entry under 35 U.S.C. § 371 of International Application No. PCT/EP2015/070428 filed Sep. 8, 2015, which claims priority to European application No. 14306438.4 filed on Sep. 17, 2014. The entire contents of these applications are explicitly incorporated herein by this reference.

TECHNICAL FIELD

The present invention pertains to a vinylidene fluoride polymer, to a method for producing the same and to the use of the same for manufacturing an article.

BACKGROUND ART

Poly(vinylidene fluoride) (PVDF) is obtainable via polymerization of vinylidene difluoride monomers (difluoro 1,1-ethylene, VF2 or VDF). Poly(vinylidene fluoride) can be advantageously used in several different applications for the manufacturing of piping products, sheets, tubing, films, plates, membranes and as an insulator for premium wire.

The main advantage of the VDF suspension polymerization is the absence of any fluorinated surfactant.

During suspension polymerization of VDF in the absence of a suspending agent, reactor fouling (that is build-up of polymer deposits on the inner surfaces of the reactor and of the stirring equipment) is observed, which prevents the scaling of the process to industrial production.

The amount of fouling may be assessed via visual inspection and expressed on an arbitrary scale 0 to 4, wherein a degree of 2 or higher indicates too much fouling for the process to be industrialized. Although the VDF polymers produced via polymerization in suspension are very white, they tend to turn brown when exposed to concentrated acids and to acid solutions for longer than 8-10 hours. This visual drawback of PVDF is perceived as detrimental and limits the use of PVDF in many applications.

EP2397519 discloses a vinylidene fluoride resin film including a vinylidene fluoride resin, a methacrylic acid ester resin, a titanium oxide surface treated with alumina and silica, and a fatty acid ester of polyethylene glycol and/or a derivative thereof. EP2397519 has the main object to provide a vinylidene fluoride resin film that, with respect to the earlier multilayer structure and films, has improved adhesiveness to a base material, achieves improved dispersivity also when a pigment is contained in large amounts, and has excellent thermal stability during a forming process.

WO2012084580 pertains to a grafted fluorinated polymer comprising at least one grafted side chain comprising one or more glycosidic recurring units, formed via a process comprising polymerizing VDF, optionally in the presence of one or more other fluorinated monomers, or one or more (meth)acrylic monomers, in the presence of at least one polysaccharide derivative, that is notably aimed at providing improved hydrophilic membranes, e.g. suitable for water purification.

One aim of the present invention is to provide a PVDF polymer having improved colour stability when exposed to acids and a process for its production.

Another object of the present invention is also to provide a method for manufacturing a PVDF polymer that is feasible and easy to scale for industrial production. It is desirable that the polymer suspension does not generate any fouling during the polymerization and that all the advantageous properties of the polymer are retained.

SUMMARY OF INVENTION

These aims are achieved by a process for manufacturing a vinylidene fluoride polymer, said process comprising polymerizing vinylidene fluoride (VDF) in aqueous suspension in the presence of at least:
a) an alkylene oxide polymer (PAO); and
b) a polysaccharide derivative,
wherein the PAO has formula (I)

$$R_A O\text{---}[(CH_2)_m O]_n\text{---}R_B \qquad (I)$$

wherein $R_A$ and $R_B$ are, independently from each other, H or a $C_1$-$C_5$ linear or branched alkyl, preferably H or $CH_3$, m, equal to or different from each other at each occurrence, is an integer from 2 to 5, and n is an integer from 1000 to 200000, preferably from 2000 to 100000, more preferably from 5000 to 70000.

The inventors surprisingly found that the polymerization of VDF in the simultaneous presence of at least a PAO polymer and of at least a polysaccharide derivative yields a polymer that is more resistant than PVDF polymers of the prior art to discoloration upon exposure to concentrated acids or to acidic solutions.

In addition, the process according to the invention does not generate fouling of the reactor during the polymerization. Hence, production of PVDF polymers according to the process of the invention can be easily carried out on industrial scale, according to the routine scale-up procedures known to the person skilled in the art.

The present invention also advantageously solves the above-mentioned problems by providing a vinylidene fluoride polymer obtainable via said method and the use of the same for the manufacturing of an article.

The present invention also provides an article comprising said vinylidene fluoride polymer.

DESCRIPTION OF EMBODIMENTS

Unless otherwise specified, in the context of the present invention, all percentages are relative to the ratio of the weight of a specific component of a mixture divided by the total weight of the mixture (indicated as wt/wt).

As used herewith, the term "vinylidene fluoride polymer" (PVDF polymer) indicates a polymer comprising more than 50% moles of recurring units derived from the polymerization of vinylidene fluoride monomer (difluoro 1,1-ethylene, VF2 or VDF). For the purpose of the present invention, the vinylidene fluoride polymer may optionally comprise, in addition to the VDF monomer, recurring units different from VDF recurring units, and which are derived from the polymerization of ethylenically unsaturated monomers different from VDF (for example 10-20 mol % with respect to the total number of moles of the composition). Said ethylenically unsaturated monomers may comprise at least one fluorine atom and can be hence designated as fluorinated comonomers. Still, the ethylenically unsaturated monomers can be free from fluorine atoms; examples of these non-fluorinated comonomers are notably acrylic monomers, including (meth)acrylic acid, hydroxyalkyl(meth)acrylates, and the like.

The hydrophilic (meth)acrylic monomer (MA) preferably complies to formula:

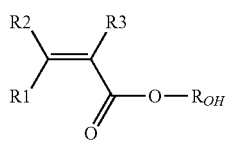

wherein each of R1, R2, R3, equal or different from each other, is independently a hydrogen atom or a $C_1$-$C_3$ hydrocarbon group, and $R_{OH}$ is a hydrogen or a $C_1$-$C_5$ hydrocarbon moiety comprising at least one hydroxyl group. Non limitative examples of hydrophilic (meth)acrylic monomers (MA) are notably acrylic acid, methacrylic acid, hydroxyethyl (meth)acrylate, hydroxypropyl(meth)acrylate; hydroxyethylhexyl (meth)acrylates.

The monomer (MA) is more preferably selected from: hydroxyethylacrylate (HEA) of formula:

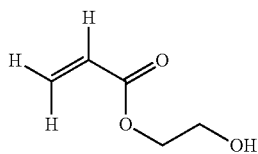

2-hydroxypropyl acrylate (HPA) of either of formulae:

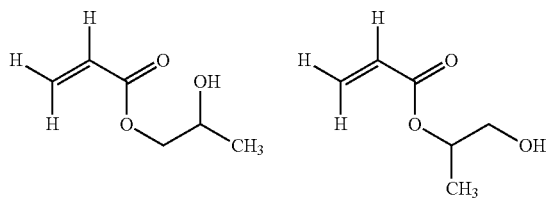

acrylic acid (AA) of formula:

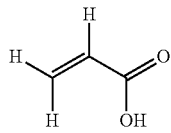

and mixtures thereof.

Most preferably, the monomer (MA) is AA and/or HEA.

Non-limiting examples of fluorinated comonomers different from VDF, as above detailed, comprise, notably, the following:

(i) $C_2$-$C_8$ fluoroolefins such as trifluoroethylene (TrFE), tetrafluoroethylene (TFE) and hexafluoropropylene (HFP);

(ii) perfluoroalkylethylenes of formula $CH_2\!=\!CH\!-\!R_{f0}$, wherein $R_{f0}$ is a $C_2$-$C_6$ perfluoroalkyl group;

(iii) chloro- and/or bromo- and/or iodo-$C_2$-$C_6$ fluoroolefins such as chlorotrifluoroethylene (CTFE);

(iv) perfluoroalkylvinylethers of formula $CF_2\!=\!CFOR_{f1}$, wherein $R_{f1}$ is a $C_1$-$C_6$ perfluoroalkyl group, such as perfluoromethylvinylether (PMVE) and perfluoropropylvinylether (PPVE);

(v) (per)fluorooxyalkylvinylethers of formula $CF_2\!=\!CFOX_0$, wherein $X_0$ is a $C_1$-$C_{12}$ oxyalkyl group or a $C_1$-$C_{12}$ (per)fluorooxyalkyl group having one or more ether groups, e.g. perfluoro-2-propoxy-propyl group;

(vi) (per)fluoroalkylvinylethers of formula $CF_2\!=\!CFOCF_2OR_{f2}$, wherein $R_{f2}$ is a $C_1$-$C_6$ (per)fluoroalkyl group, e.g. —$CF_3$, —$C_2F_5$, —$C_3F_7$, or a $C_1$-$C_6$ (per)fluorooxyalkyl group having one or more ether groups, e.g. —$C_2F_5$—O—$CF_3$;

(vii) functional (per)fluorooxyalkylvinylethers of formula $CF_2\!=\!CFOY_0$, wherein $Y_0$ is selected from a $C_1$-$C_{12}$ alkyl group or (per)fluoroalkyl group, a $C_1$-$C_{12}$ oxyalkyl group and a $C_1$-$C_{12}$ (per)fluorooxyalkyl group having one or more ether groups, $Y_0$ comprising a carboxylic or sulfonic acid group, in its acid, acid halide or salt form;

(viii) fluorodioxoles, especially perfluorodioxoles;

(ix) vinyl fluoride, and their mixtures.

Most preferred fluorinated comonomers are chlorotrifluoroethylene (CTFE), trifluoroethylene (TrFE), tetrafluoroethylene (TFE), hexafluoropropylene (HFP), perfluoromethylvinylether (PMVE).

The expression "alkylene oxide polymer" or (PAO) is used within the frame of this invention to designate a homopolymer or copolymer consisting essentially of recurring units derived from linear alkylene oxide(s) and complying with formula (I) as above detailed.

For the purpose of the present invention, notably the definition of PAOs does not encompass polymers including recurring branched units derived from alkylene oxide, e.g. 2-propylene units (—$CH(CH_3)CH_2$—).

Alkylene oxide homo- or co-polymers that are suitable for being used in the present invention as component (a) are typically, but not exclusively, selected from homopolymers consisting of recurring units derived from ethylene oxide (EO), such as polyethylene glycols (also indicated as PEGs, POEs or PEOs).

Typically, the average molecular weight ($M_v$) of the alkylene oxide polymers in the context of the present invention ranges from 50,000 to 10,000,000 g/mol as measured by the techniques known to the person skilled in the art, such as by determination of the viscosity of their solution in water.

According to preferred embodiments, the alkylene oxide polymer (PAO) is a polyethylene oxide having formula (II):

$$R_AO\text{—}(CH_2CH_2O)_n\text{—}R_B \quad\quad (II)$$

wherein $R_A$ and $R_B$ are, independently from each other, H or a $C_1$-$C_5$ alkyl, preferably H or $CH_3$, n is an integer from 1000 to 200000, preferably from 2000 to 100000, more preferably from 5000 to 70000.

Still, according to more preferred embodiments, the alkylene oxide polymer (PAO) is a polyethylene glycol having formula (IIb):

$$HO\text{—}(CH_2CH_2O)_n\text{—}H \quad\quad (IIb)$$

wherein n is an integer from 1000 to 200000, preferably from 2000 to 100000, more preferably from 5000 to 70000.

Preferably, in the process of the invention the polymerization of vinylidene fluoride in aqueous suspension is carried out in the presence of 0.0001 to 20 g of the alkylene oxide polymer of formula (I), and in preferred embodiments of the polyethylene oxide of formula (II), and in even more preferred embodiments of the polyethylene glycol having formula (IIb), per kg of vinylidene fluoride.

More preferably, in the process of the invention the polymerization of vinylidene fluoride in aqueous suspension is carried out in the presence of 0.005 to 10 g of the alkylene oxide polymer of formula (I), and in preferred embodiments of the polyethylene oxide of formula (II), and in even more preferred embodiments of the polyethylene glycol having formula (IIb), per kg of vinylidene fluoride.

The term "polysaccharide derivative" is hereby intended to indicate a derivative of a polysaccharide polymer comprising as recurring units one or more glycosidic units linked to each other by glycosidic bonds. Glycosidic units are hereby intended to denote either six-membered pyranoside rings or five-membered furanoside rings.

Non-limitative examples of suitable six-membered pyranosides include, notably, D-glucopyranosides such as α-D-glucopyranosides or µ-D-glucopyranosides.

Unless otherwise specified, the dynamic viscosity of the polysaccharides and of the other polymers in the method of the invention is measured according to ASTM D445 at 20° C. in an aqueous solution at a concentration of 2% by weight.

Preferably, in the process of the present invention the dynamic viscosity of the polysaccharide derivative is 1 to 30,000 mPa·s, about 3 to about 21,000, about 50 to about 15,000, about 80 to about 13,000 mPa·s, about 120 to about 11,250 mPa·s, as measured according to ASTM D445 at 20° C. in an aqueous solution at a concentration 2% by weight.

More preferably, in the process of the present invention the dynamic viscosity of the polysaccharide derivative is 2.4 to 3.6 mPa·s, 80 to 120 mPa·s or 11,250-21,000 mPa·s, as measured according to ASTM D445 at 20° C. in an aqueous solution at a concentration of 2% by weight.

Preferably, in the process of the present invention the polysaccharide derivative comprises recurring glycosidic units selected from D-glucopyranosides and glucofuranosides, or a mixture thereof, linked to each other by glycosidic bonds.

More preferably, in the process of the present invention the polysaccharide derivative (b) comprises recurring β-D-glucopyranosides units of formula (III), linked to each other by β-glycosidic bonds:

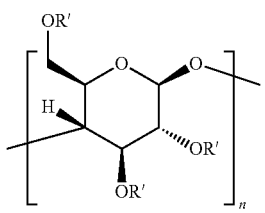

wherein each R', equal to or different from any other at each occurrence, represents a hydrogen atom, a $C_1$-$C_8$ hydrocarbon group or a $C_2$-$C_8$ hydroxyalkyl group.

More preferably, in the carbohydrate derivative of formula (III), each R', equal to or different from any other, represents a hydrogen atom, a methyl group, a hydroxyethyl group or a 2-hydroxypropyl group.

More preferably, in the process of the invention the carbohydrate derivative of formula (III) is methylcellulose, hydroxyethyl methylcellulose or 2-hydroxypropyl methylcellulose, the latter being particularly preferable.

Even more preferably, in the process of the invention the carbohydrate derivative is hydroxypropyl methylcellulose, wherein the methoxy degree of substitution (i.e. the average number per mole of groups R' where R'=methyl in formula (III), with respect to the total number of groups R') is about 1.2 to 1.6 (e.g. 1.4) and/or the hydroxypropyl degree of substitution (i.e. the average number per mole of groups R' where R'=2-hydroxypropyl in formula (III), with respect to the total number of groups R') is about 0.15 to 0.25 (e.g. 0.21).

As non-limiting examples, the hydroxypropyl methylcellulose in the process of the invention has a dynamic viscosity of about 80 to 120 mPa·s or about 11,250 to 21,000 mPa·s at 20° C. in an aqueous solution at a concentration of 2% by weight.

Non-limitative examples of polysaccharide derivatives suitable for the process of the invention include, notably, cellulose derivatives available under the trademark names METHOCEL™ K100, having a dynamic viscosity of 80-120 mPa·s at 20° C. in an aqueous solution at a concentration of 2% by weight, METHOCEL™ K15M, having a dynamic viscosity of 11,250-21,000 mPa·s at 20° C. in an aqueous solution at a concentration of 2% by weight, METHOCEL™ K3, having a dynamic viscosity of 2.4 to 3.6 mPa·s at 20° C. in an aqueous solution at a concentration of 2% by weight, METHOCEL™ K4M, having a dynamic viscosity of 3000 to 6000 mPa·s at 20° C. in an aqueous solution at a concentration of 2% by weight and CULMINAL® MHPC5 having a dynamic viscosity of 4 to 8 mPa×s at 20° C. in an aqueous solution at a concentration of 2% by weight.

Preferably, in the process of the invention the polymerization of vinylidene fluoride in aqueous suspension is carried out in the presence of 0.0001 to 20 g of polysaccharide derivative (b) per kg of vinylidene fluoride, more preferably 0.01 to 5 g or 0.03 to 1 g, even more preferably 0.07 to 0.3 g of polysaccharide derivative (b) per kg of vinylidene fluoride.

The process of the invention is typically carried out in an aqueous medium in the presence of a radical initiator. While the choice of the radical initiator is not particularly limited, it is understood that those initiators suitable for the process according to the invention are selected from compounds capable of initiating and/or accelerating the polymerization process.

Among radical initiators which may advantageously be used in the process of the invention, mention can be made of organic radical initiators. Non-limitative examples of suitable organic radical initiators include, but are not limited to, the following: acetylcyclohexanesulfonyl peroxide; diacetylperoxydicarbonate; dialkylperoxydicarbonates such as diethylperoxydicarbonate, dicyclohexylperoxydicarbonate, di-2-ethylhexylperoxydicarbonate; tert-butylperneodecanoate; 2,2'-azobis(4-methoxy-2,4dimethylvaleronitrile; tert-butylperpivalate; tert-amylperpivalate; dioctanoylperoxide; dilauroyl-peroxide; 2,2'-azobis (2,4-dimethylvaleronitrile); tert-butylazo-2-cyanobutane; dibenzoylperoxide; tert-butyl-per-2ethylhexanoate; tert-butylpermaleate; 2,2'-azobis(isobutyronitrile); bis(tert-butylperoxy)cyclohexane; tert-butyl-peroxyisopropylcarbonate; tert-butylperacetate; 2,2'-bis (tert-butylperoxy)butane; dicumyl peroxide; di-tert-amyl peroxide; di-tert-butyl peroxide (DTBP); p-methane hydroperoxide; pinane hydroperoxide; cumene hydroperoxide; and tert-butyl hydroperoxide.

The process of the invention is carried out at temperatures of typically at least 10° C., preferably of at least 25° C., more preferably of at least 45° C.

The pressure is typically maintained at a value of more than 50 bar, preferably of more than 75 bar, even more preferably of more than 90 bar.

In addition to a PAO (a) and a saccharide polymer derivative (b), also one or more suspension stabilizers, having a chemical structure different from saccharide derivatives (such as polyvinyl alcohols) may advantageously be used in the process of the invention.

In one embodiment, the present invention pertains to a PVDF polymer obtainable via the process as described above.

Furthermore, it was found that the polymer that can be obtained according to the process of the present invention has a higher thermal stability of the resin in extrusion with respect to the currently available PVDF polymers. In fact, the colour of the PVDF polymer of the present invention remains practically unchanged even after a second pelletization, whereas the PVDF polymers of the prior art tend to turn yellowish after similar treatments. Without intention to be bound by theory, the inventors are of the opinion that this advantage is linked to the simultaneous use of a polysaccharide derivative and of a PAO comprising only linear alkyl units as suspending agents in the polymerization step.

In one embodiment, the present invention pertains to the use of the PVDF polymer obtainable via the process as described above for the manufacturing of an article comprising said polymer.

As non-limiting examples, the polymer obtainable via the above-described process can be advantageously used for the manufacturing of articles for the semiconductor industry, such as wet benches or pipes that carry acid solutions. In one embodiment, the present invention pertains to an article comprising the PVDF polymer obtainable via the process as described above.

Should the disclosure of any patents, patent applications, and publications which are incorporated herein by reference conflict with the description of the present application to the extent that it may render a term unclear, the present description shall take precedence.

The following examples are provided to illustrate with further details the invention and they are not intended to limit its scope.

EXAMPLES

Materials

The PAOs used in the hereby exemplified working embodiments are polyethylene oxides (PEO) commercially available under the name Alkox® (Meisei Chemical Works, Ltd). Their properties are listed in the table below

TABLE 1

| Grade of PEO (Alkox ®) | Molecular weight (*1000) | Viscosity of solution in water | |
|---|---|---|---|
| | | wt % | mPa · s |
| R-150 | 100-170 | 10 | 70-200 |
| E-45 | 600-800 | 2 | 300-600 |
| E-60 | 1,000-1,200 | 2 | 2,000-4,000 |
| E-240 | 4,500-5,000 | 0.5 | 200-250 |

The following polysaccharide derivatives were used:
METHOCEL® K100 having a dynamic viscosity of 80-120 mPa·s at 20° C. in an aqueous solution at a concentration of 2% by weight.
METHOCEL® K15M having a dynamic viscosity of 11,250-21,000 mPa·s at 20° C. in an aqueous solution at a concentration of 2% by weight.
General Synthesis Procedure of VDF Polymer:
Type of Synthesis (Procedure A)
In a 4 L reactor were introduced in sequence 2,410 g of demineralized water and one or two suspending agent: METHOCEL® K100 (from DOW Chemical) and PEO (ALKOX® grades) as shown in Table 2.

The mixture was stirred with an impeller running at a speed of 880 rpm.

The reactor was purged with a sequence of vacuum (30 mmHg) and purged of nitrogen (fixed at 1 bar) at a fixed temperature of 14° C. This sequence was done 3 times. Then diethylcarbonate (DEC) in amount according to Table 2 and 1.5 g of a solution of the initiator t-amyl perpivalate in isododecan (75%) were added in the reactor. 1,070 g of initial VDF were introduced in the mixture. The reactor was gradually heated until the first set-point temperature fixed at 52° C. At this temperature, the pressure was fixed at 120 bar. The pressure was maintained at 120 bar by feeding in total 249 g of VDF during the polymerization. After this feeding, no more monomer was fed and the pressure started to decrease down to 90 bar. Then, the reactor was gradually heated at 67° C. The pressure was kept at 80 bar and 286 g of VDF were fed to the reactor. The pressure then was decreased to 55 bar. In general a conversion around 80-90% of VDF was achieved in all working embodiments. The polymerization was stopped by degassing the reactor until reaching atmospheric pressure.

The VDF polymer was collected by filtration and washed in demineralized water. After the washing step, the polymer powder was dried at 65° C. overnight.
Type of Synthesis (Procedure B)

In a 4 liter reactor equipped with an impeller running at a speed of 880 rpm were subsequently introduced 2,391 g of demineralized water, METHOCEL® K15M (from DOW Chemical) and/or PEO (ALKOX® grades) as detailed in Table 2.

The reactor was then repeatedly evacuated and purged with nitrogen (1 bar) while maintaining the temperature at 14° C. Then, diethylcarbonate (DEC) according to Table 2, 1 g/kg of VDF was fed to a 75% by weight solution of tert-amyl perpivalate radical initiator in isododecane and 1,069 g of VDF were introduced into the reactor. The reactor was then gradually heated until the set-point temperature of 52° C. was reached, which corresponded to a pressure of 120 bar. The pressure was maintained at 120 bar during the whole polymerization run by feeding water. After conversion of about 80-90% of the VDF, the polymerization was stopped by degassing the suspension until reaching atmospheric pressure. The polymer was then collected by filtration, washed with demineralized water and oven-dried at 65° C. overnight.

PVDF Plaque Preparation:

The PVDF plaques were obtained by compression molding. The press temperature was set up at 230° C. and 32 g of polymer were introduced in a Frame with a size of: 130×80×1.5 mm. The molding required three steps: (1) five minutes for the preheating step; (2) one minute for the degassing step and (3) 1 minute for the molding step. After these steps, the plaque was cooled in a fast condition between two plates cooled with water at room temperature. Aluminum or Mylar was used as substrate for the plaques.

HCl Test:

The HCl test was carried out in a glass tube with a water-cooled reflux condenser. Each plaque was suspended in the acid solution without agitation, as described in ASTM D543 method.

The tube was inserted in an oven, controlled by a thermocouple at temperature=80±1° C. The PVDF plaques were immersed for 72 hours in a titrated 37% HCl solution.

Color

Levels of color were determined by visual inspection and categorized as white, light yellow (LY), yellow (Y), brown (B) and dark brown (DB).

WI (White Index).

WI was measured on a plaque according to ASTM E313-96 using a colorimeter Minolta CR410®.

The results are summarized in the following table.

TABLE 2

| Ex. No. | PEO [g/kg VDF fed] | P [g/kg. VDF fed] | Proc | DCE [g/kg. VDF fed] | T [h] | Yi [%] | MFI [g/10 min] | Color after HCl test | RFa) |
|---|---|---|---|---|---|---|---|---|---|
| 1c | — | MK 100 [0.4] | A | 20 | 4:55 | 87 | 4.3 | DB | (0) |
| 2c | — | MK 100 [0.1] | A | 20 | 5:32 | 88 | 3.0 | n.a | (2) |
| 3c | E 60 [1.0] | — | B | 24.5 | 5:03 | 75 | n.a | n.a | (3) |
| 1 | E 60 [0.4] | MK 100 [0.1] | A | 20 | 4:58 | 87 | 4.6 | L | (0) |
| 2 | E 45 [0.4] | MK 100 [0.1] | A | 20 | 5:13 | — | 4.1 | — | (1) |
| 3 | R 150 [0.4] | MK 100 [0.1] | A | 20 | 5:47 | 87 | 4.2 | Y | (0) |
| 4 | E 60 [0.4] | MK 100 [0.05] | A | 20 | 6:33 | 87 | 4.3 | LY | (1) |
| 5 | E 60 [0.4] | MK 15M [0.1] | B | 24.5 | 5:04 | 82 | 12.4 | Y | (1) |
| 6 | E 60 [0.4] | MK 100 [0.01] | A | 18-5 | 6:31 | 85 | 2.8 | LY | (1) |
| 7 | E 60 [0.3] | MK 100 [0.1] | A | 18.5 | 5:12 | 86 | 2.1 | — | (0) |
| 8 | E 240 [0.4] | MK 100 [0.1] | A | 20 | 5:40 | 86 | 4 | Y | (0) |
| 4c | E 60 [0.4] | — | B | 24.5 | 0:37 | n.a | n.a | n.a | (4) |
| 5c | E 240 [0.4] | — | B | 24.5 | 0:55 | n.a | n.a | n.a | (4) |

Samples labelled "1c" to "5c" are comparative examples. PEO=Type of ethylene oxide (ALKOX® grades). PD=polysaccharide derivative. Proc.=type of procedure; t=time (in hours); X=yield; MFI=Melt Flow Index measured at 230° C. (under 5 kg) [g/10 min] according to ASTM D 1238; n.a.: not applicable; RF=reactor fouling (at the end of polymerization) determined by visual inspection according to an arbitrary scale from 0 to 4: (0): the reactor was clean; (1): some polymer traces (no issue with industrialization); (2,3) too much fouling to be industrialized; (4) formation of a block of polymer inside the reactor.

Examples 9 and 9c

The polymer of example 9 was obtained by the procedure of example 1, except that 18.5 g/kg VDF of EDC were used instead of 20.0 g/kg VDF. The polymer of comparative example 9c was obtained by the procedure of example 1c, except that 18.5 g/kg VDF of EDC were used instead of 20.0 g/kg VDF. The polymers thus obtained were then pelletized twice and the results on WI indexes were as follows.

Example 9: WI, First Pelletization: 54; WI, Second Pelletization: 53

Comparative Example 9c: WI, First Pelletization: 54; WI, Second Pelletization: 46.

The invention claimed is:

1. A process for manufacturing a vinylidene fluoride polymer, said process comprising polymerizing vinylidene fluoride (VDF) in aqueous suspension in the simultaneous presence of at least:
   a) an alkylene oxide polymer (PAO); and
   b) a polysaccharide derivative,
   wherein the PAO has formula (I)

wherein $R_A$ and $R_B$ are, independently from each other, H or a $C_1$-$C_5$ linear or branched alkyl, m, equal to or different from each other at each occurrence, is an integer from 2 to 5, and n is an integer from 1000 to 200000.

2. The process of claim 1, wherein the polysaccharide derivative has a dynamic viscosity of 1 to 30,000 mPa·s.

3. The process of claim 1, wherein the polysaccharide derivative comprises recurring glycosidic units selected from D-glucopyranosides and glucofuranosides, or a mixture thereof, linked to each other by glycosidic bonds.

4. The process of claim 3, wherein the polysaccharide derivative comprises recurring β-D-glucopyranoside units of formula (III) linked to each other by β-glycosidic bonds

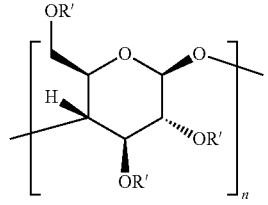

wherein each R', equal to or different from any other, represents a hydrogen atom, a C1-C8 hydrocarbon group or a C2-C8 hydroxyalkyl group.

5. The process of claim 4, wherein each R' in the carbohydrate derivative of formula (III), equal to or different from any other, represents a hydrogen atom, a methyl group, a hydroxyethyl group or a 2-hydroxypropylgroup.

6. The process of claim 5, wherein the carbohydrate derivative of formula (III) is methylcellulose, hydroxyethyl methylcellulose or 2-hydroxypropyl methylcellulose.

7. The process of claim 6, wherein the carbohydrate derivative is 2-hydroxypropyl methylcellulose having a methoxy degree of substitution of about 1.2 to 1.6 per mole and/or a hydroxypropyl degree of substitution of about 0.15 to 0.25 per mole.

8. The process of claim 1, wherein the alkylene oxide polymer (PAO) is a polyethylene oxide having formula (II):

wherein $R_A$ and $R_B$ are, independently from each other, H or a $C_1$-$C_5$ alkyl, n is an integer from 1000 to 200000.

9. The process of claim 1, wherein the alkylene oxide polymer (PAO) is a polyethylene glycol having formula (IIb):

wherein n is an integer from 1000 to 200000.

10. The process of claim 1, wherein the polymerization of vinylidene fluoride in aqueous suspension is carried out in the presence of 0.005 to 20 g of alkylene oxide polymer (PAO) per kg of vinylidene fluoride.

11. The process of claim 1, wherein the polymerization of vinylidene fluoride in aqueous suspension is carried out in the presence of 0.0001 to 10 g of alkylene oxide polymer (PAO) per kg of vinylidene fluoride.

12. The process of claim 1, wherein $R_A$ and $R_B$ are, independently from each other, H or $CH_3$.

13. The process of claim 1, wherein n is an integer from 5000 to 70000.

14. The process of claim 2, wherein the polysaccharide derivative has a dynamic viscosity of about 120 to about 11,250 mPa·s.

15. The process of claim 1, wherein:
the polysaccharide derivative comprises recurring glycosidic units selected from D-glucopyranosides and glucofuranosides, or a mixture thereof, linked to each other by glycosidic bonds; and
the alkylene oxide polymer (PAO) is a polyethylene oxide having formula (II):

  (II)

wherein $R_A$ and $R_B$ are, independently from each other, H or a $C_1$-$C_5$ alkyl, and n is an integer from 1000 to 200000.

16. The process of claim 3, wherein:
the polysaccharide derivative comprises recurring β-D-glucopyranoside units of formula (III) linked to each other by β-glycosidic bonds

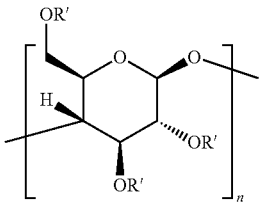

wherein each R', equal to or different from any other, represents a hydrogen atom, a C1-C8 hydrocarbon group or a C2-C8 hydroxyalkyl group, and
the alkylene oxide polymer (PAO) is a polyethylene glycol having formula (IIb):

  (IIb)

wherein n is an integer from 1000 to 200000.

17. The process of claim 16, wherein n is an integer from 5000 to 70000.

* * * * *